Nov. 27, 1934.   W. SIECK, JR   1,982,598
DISTILLATION SYSTEM
Filed April 17, 1933
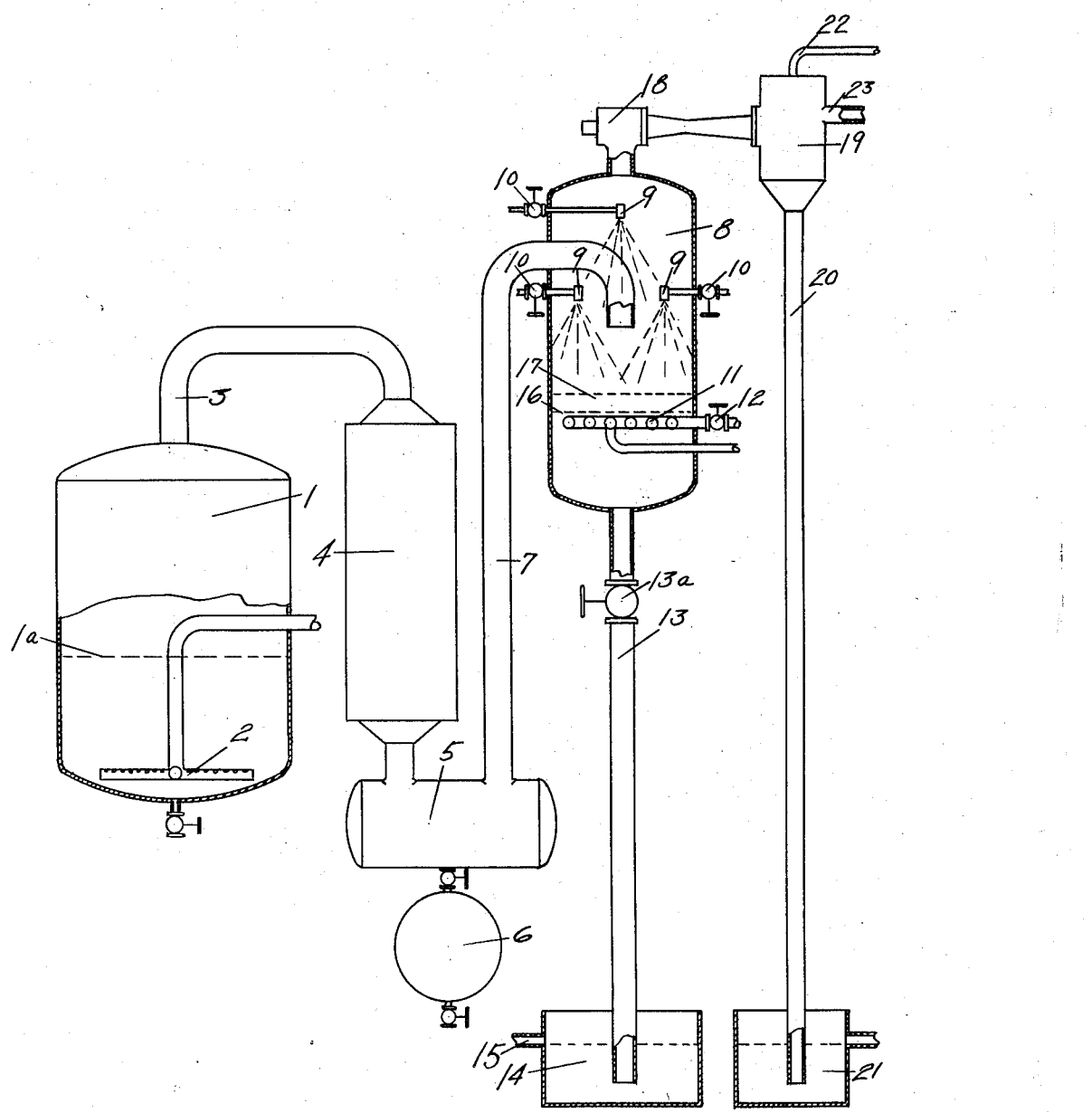
INVENTOR
William Sieck Jr.,
By [signature] ATTY.

Patented Nov. 27, 1934

1,982,598

UNITED STATES PATENT OFFICE 1,982,598

DISTILLATION SYSTEM

William Sieck, Jr., Hubbard Woods, Ill., assignor to William Garrigue & Co., Chicago, Ill., a corporation of Illinois Application April 17, 1933, Serial No. 666,413

2 Claims. (Cl. 202—199)

In carrying out certain distillations under vacuum and with the use of steam injected into the substance to be distilled, the degree of vacuum which can be maintained in the system is dependent upon the temperature of the cooling water supplied to the condenser.

Use has therefore been made of thermocompressors, which force the vapors to be condensed into the final condenser. By this means it is possible, for instance, to maintain a vacuum of 29" to 29.5" in the distilling system, and condense the vapors with cooling water at a temperature corresponding to 24" to 25" vacuum.

One example of such practice is the distillation of fatty acids under high vacuum. In such a system the vapors from the still, which consists of a mixture of fatty acid vapors and steam, are allowed to pass into a surface condenser maintained at a suitable temperature to condense the greater part of the fatty acid vapors, but at the same time allow the steam to pass through. The vapors leaving the surface condenser are compressed by means of a thermocompressor into a barometric condenser where the steam and the remaining fatty acid vapors are condensed. In such a system a vacuum of 29–29.5" may be maintained in that part of the system ahead of the thermocompressor, and the barometric condenser may operate at as low a vacuum as 24–25".

Under such conditions the thermocompressor has to compress the vapors through a range of 4"–5" of mercury and the steam consumption of the thermocompressor operating under such conditions is high. On the other hand, if an attempt is made to reduce the load on the thermocompressor by raising the vacuum on the barometric condenser by maintaining a lower cooling water temperature, the fatty acids which are carried into the barometric condenser along with the steam solidify, and in a very short time render the barometric condenser inoperative.

It will therefore be seen that with such a system as described above, full advantage cannot be taken of the best possible vacuum obtainable with respect to the temperature of the cooling water supplied to the barometric condenser.

A further disadvantage of this previously employed system is that any fatty acids carried into the barometric condenser are mixed with a large quantity of water. While these fatty acids are insoluble in water, there is, however, a tendency for the fatty acids to form a partial emulsion with the condensing water, and considerable fatty acids are lost with the condensing water.

Again, if such a system is applied to the distillation of glycerine, the glycerine vapors which find their way into the final barometric condenser will condense and be in solution with a large quantity of water from which it would be impractical to recover them by evaporation and concentration.

One of the objects of the present invention is to provide a system of distillation in which full advantage can be taken of the temperature of the available cooling water insofar as the degree of vacuum is concerned, and at the same time obviate such losses of distillate as occur with the prior processes described above.

In the present invention the distillation system operates with a lower steam consumption and, if condensing water of a suitable temperature is available, the use of the thermo-compressor may be dispensed with.

In the accompanying drawing,

The figure is a diagrammatic view of an apparatus by means of the use of which this process may be carried into operation.

Referring more particularly to the drawing the numeral 1 designates a still of suitable construction externally heated by any suitable means (not shown), and is fitted with a perforated coil 2 by means of which steam and other fluids may be injected into the contents of the still. The top of the still communicates by means of a conduit 3 with a surface condenser 4, of suitable construction. The outlet of the surface condenser is connected with a separator tank 5, and this separator tank in turn communicates with a receiver tank 6, which latter receives the condensates from the surface condenser 4.

The separator 5 communicates with a flash chamber 8, through the medium of a conduit 7, and the flash chamber is fitted with any suitable number of spray nozzles 9, the flow of fluid to which nozzles is regulated by means of valves 10.

The bottom of the flash chamber is drained by means of a barometric leg 13, fitted with a valve 13ª, to a hot well 14. The hot well is provided with an overflow 15 for maintaining a constant liquid level in the hot well. The top of the flash chamber communicates with a thermocompressor 18 which, however, may be omitted in cases where it is not necessary to use the same.

The discharge end of the thermocompressor is connected to a suitable barometric condenser 19, which is provided with a barometric leg 20 emptying into a hot well 21. The barometric condenser is supplied with a condensing water inlet 23 and a connection 22 through which the non-condensable gases may be removed from the condenser by means of an air removing device of suitable construction. The flash chamber 8 is also fitted with a heating coil 11 to which heating fluid may be admitted by means of a valve 12.

The operation of this process will be described in connection with the distillation of fatty acids, but it is to be understood that the invention is not to be limited to such use, nor to the use of the specific media hereinafter described.

A vacuum of 29" or more is maintained in the system and the still 1 is filled with the fatty acids to be distilled, to a level at approximately 1ª, and the contents of the still externally heated by any suitable means, and steam is injected into the still contents from any suitable source, by means of the perforated coil 2.

The mixture of the steam and fatty acid vapors will pass from the still into the surface condenser 4, which latter is kept at a temperature, usually 110–130° F., to allow the greater portion of the fatty acids to condense, but at the same time allow the steam to pass through the surface condenser without condensing.

The condensed fatty acids will be separated out in the separator tank 5 and collected in the receiver tank 6. The steam and the remainder of the fatty acid vapors, which may have a temperature of over 110° F., will pass into the flash chamber 8. At the same time water at a suitable temperature is injected into the flash chamber by means of the nozzles 9.

Due to the fact that a high vacuum exists in the flash chamber, a portion or all of the injected water will be at once flashed into steam, abstracting heat from the incoming vapors and lowering the temperature of the vapors in the flash chamber to a point where the fatty acids carried over by the incoming vapors are condensed.

In actual operation the water supplied to the nozzles 9 may be so controlled as to maintain a temperature of say 60° F. in the flash chamber. The elevation of the flash chamber above the hot well 14 is such that the water surface in the flash chamber, when the same is operating under vacuum, will be at a point, such as indicated at 16. The condensed fatty acids form a layer, such as at 17 on top of the water but, due to the comparatively large diameter (which may be six feet or more) of the flash chamber, the fatty acids do not form a layer coherent enough to prevent any unvaporized injection water from passing therethrough and out through the barometric leg 13. The cool vapors and non-condensable gases will be withdrawn from the flash chamber by means of the thermocompressor 18 which discharges them into the barometric condenser, and which latter may be operating at a vacuum of 28" to 28.5", dependent upon the temperature of the cooling water.

The flash chamber 8 is of a dimension large enough to insure room for all of the fatty acids which may be condensed during a normal run of the still. When the still is shut down, the injection water will be shut off, valve 13ª will be closed, and steam is turned into the coil 11, raising the temperature of the water in the bottom of the flash tank, which in turn melts the fatty acids.

The valve 13ª is opened and the water and melted fatty acids will flow into the hot well 14, where they are easily separated and recovered.

It will therefore be seen that the present invention will operate with a much lower steam consumption than other systems now in use. For instance, when operating the still without the flash chamber, at a vacuum of 29.5" on the suction side of the thermocompressor, and a vacuum of 24" on the barometric condenser, the thermocompressor will require from ten to fifteen times as much steam as a thermocompressor operating with a vacuum of 29.5" on the suction side and 28.5" on the discharge side. Also, in the first case the fatty acids which pass through the barometric condenser will be mixed with all of the water passing into the barometric condenser, while in the case of the present invention the carried over fatty acids are mixed only with the water injected into the flash chamber 8.

Under ordinary operating conditions the water injected into the flash chamber may be in a quantity as low as one-fortieth of the water supplied to the barometric condenser, and it at once becomes apparent that the losses due to fatty acids being carried away by the condensing water are greatly reduced.

When the present invention is employed in the distillation of glycerine or other substances soluble in the condensing water, or whatever condensing medium is used, the recovery of distillate by evaporation and concentration is commercially practicable, due to the much lower dilution of the distillates. Also, with the present invention the vapors passing to the thermocompressor are at a lower temperature and therefore reduce the load on the thermocompressor still further.

In some locations where water can be supplied at a low enough temperature, it is possible to maintain a high enough vacuum in the barometric condenser to allow eliminating the thermocompressor, and in such cases an additional saving in steam consumption may be effected.

While the preferred form of apparatus for carrying this invention into operation has been herein shown, and the preferred method by which this operation may be carried into effect has also been described, it is to be understood that various changes may be made in the combination and arrangement of the apparatus and in the steps of the method, within the scope of the claims, without departing from the spirit of this invention.

What is claimed as new is:—

1. A vacuum distillation system comprising a still with means for injecting a fluid into the contents of said still, a surface condenser for receiving and partially condensing vapors from the still, a flash chamber connected with the surface condenser and receiving vapors therefrom, means for cooling and partially condensing the vapors in the flash chamber by the injection and vaporization of a fluid in the flash chamber, a barometric condenser connected with said flash chamber for receiving and condensing the vapors not condensed in the flash chamber, and heating means within the flash chamber.

2. A vacuum distillation system comprising a still with means for injecting a fluid into the contents of said still, a surface condenser for receiving and partially condensing vapors from the still, a flash chamber connected with the surface condenser and receiving vapors therefrom, means for cooling and partially condensing the vapors in the flash chamber by the injection and vaporization of a cooling fluid in the flash chamber, a thermocompressor, the suction side of which is connected with the flash chamber and the discharge side thereof being connected to a barometric condenser, and heating means within the flash chamber.

WILLIAM SIECK, Jr.